United States Patent [19]

Jones et al.

[11] 4,292,115

[45] Sep. 29, 1981

[54] CARTRIDGE FILM UNLOADING AND SPLICING SYSTEM

[75] Inventors: Herman L. Jones, Marysville; Richard F. Kent, Snohomish, both of Wash.

[73] Assignee: J & H Manufacturing, Inc., Marysville, Wash.

[21] Appl. No.: 65,230

[22] Filed: Aug. 9, 1979

Related U.S. Application Data

[63] Continuation of Ser. No. 945,251, Sep. 25, 1978, abandoned, which is a continuation of Ser. No. 676,062, Apr. 12, 1976, abandoned.

[51] Int. Cl.3 ........................ B65H 21/00; G03B 1/20

[52] U.S. Cl. .................................... 156/502; 156/505; 156/517; 156/584; 156/543; 221/268; 221/272; 221/301; 226/91; 226/92; 242/197; 354/109; 354/297

[58] Field of Search ............... 156/505, 506, 584, 344, 156/157, 159, 517, 502, 543; 354/86, 322, 297, 323, 109; 221/301, 268, 272; 226/91, 92, 109; 242/197; 352/157, 158

[56] References Cited

U.S. PATENT DOCUMENTS

| | | | |
|---|---|---|---|
| 2,852,159 | 9/1958 | Klein | 221/301 |
| 3,034,684 | 5/1962 | Jackson | 221/301 |
| 3,221,620 | 12/1965 | Sano et al. | 354/297 |
| 3,369,697 | 2/1968 | Gluckman et al. | 221/301 |
| 3,507,726 | 4/1970 | Crew | 156/344 |
| 3,508,680 | 4/1970 | Ewald et al. | 221/301 |
| 3,753,507 | 8/1973 | James et al. | 221/301 |
| 3,779,837 | 12/1973 | Izahn et al. | 156/506 |
| 3,780,922 | 12/1973 | Bloemendaal et al. | 156/584 |
| 3,823,888 | 7/1974 | Zaagenfeind et al. | 242/55 |
| 3,921,878 | 11/1975 | Bangenfeind | 226/92 |
| 3,925,143 | 12/1975 | Aldo | 156/505 |
| 4,196,040 | 4/1980 | Houck | 156/584 |
| 4,204,620 | 5/1980 | Wurfel | 226/92 |

*Primary Examiner*—Jerome W. Massie
*Attorney, Agent, or Firm*—Dowrey & Cross

[57] ABSTRACT

The system dispenses, unloads and discharges film cartridges while unloaded film strips are cut, identified, spliced end-to-end and wound into a roll—all automatically. The system alternatively provides semi-automatic or manual handling of individual cartridges or film strips and is especially suited for unloading and splicing so-called "110" cartridge film.

10 Claims, 19 Drawing Figures

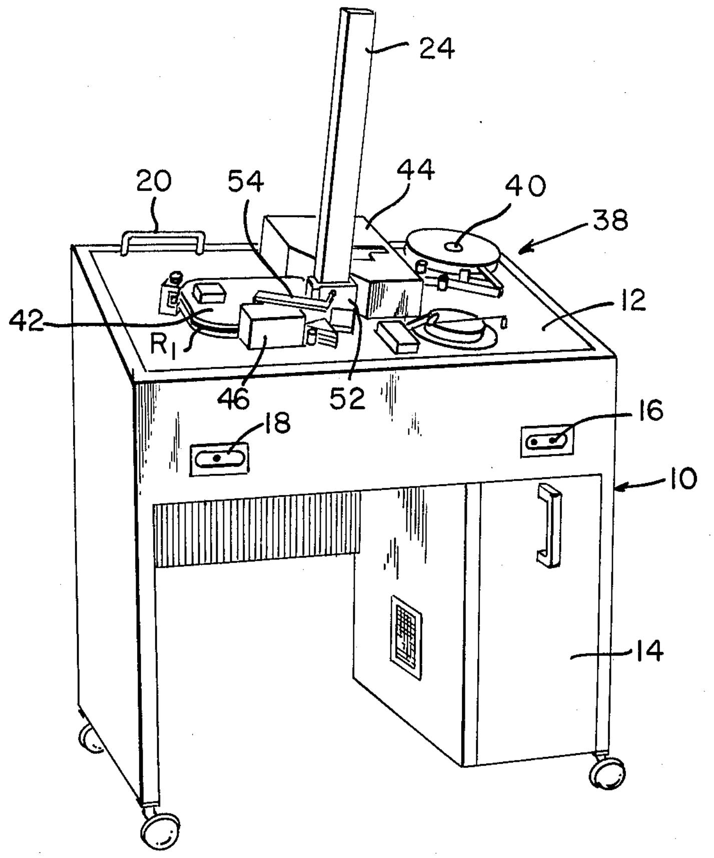
FIG. 1
FIG. 2
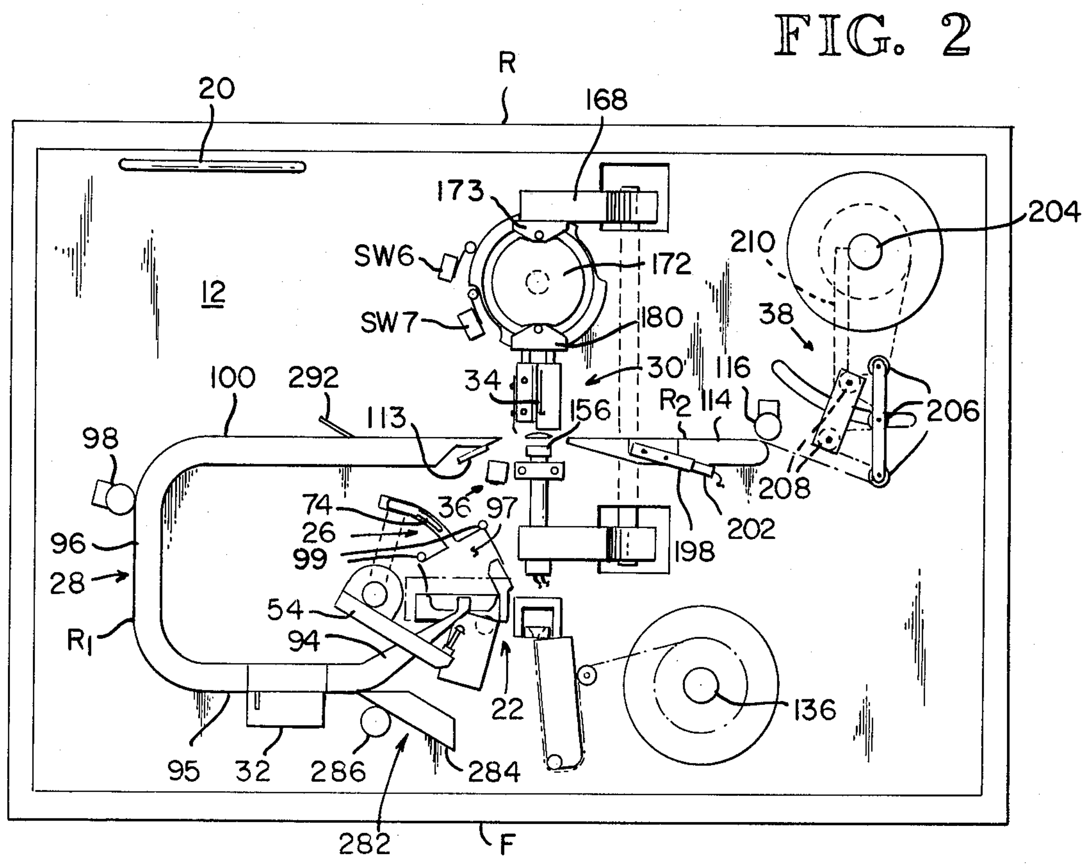

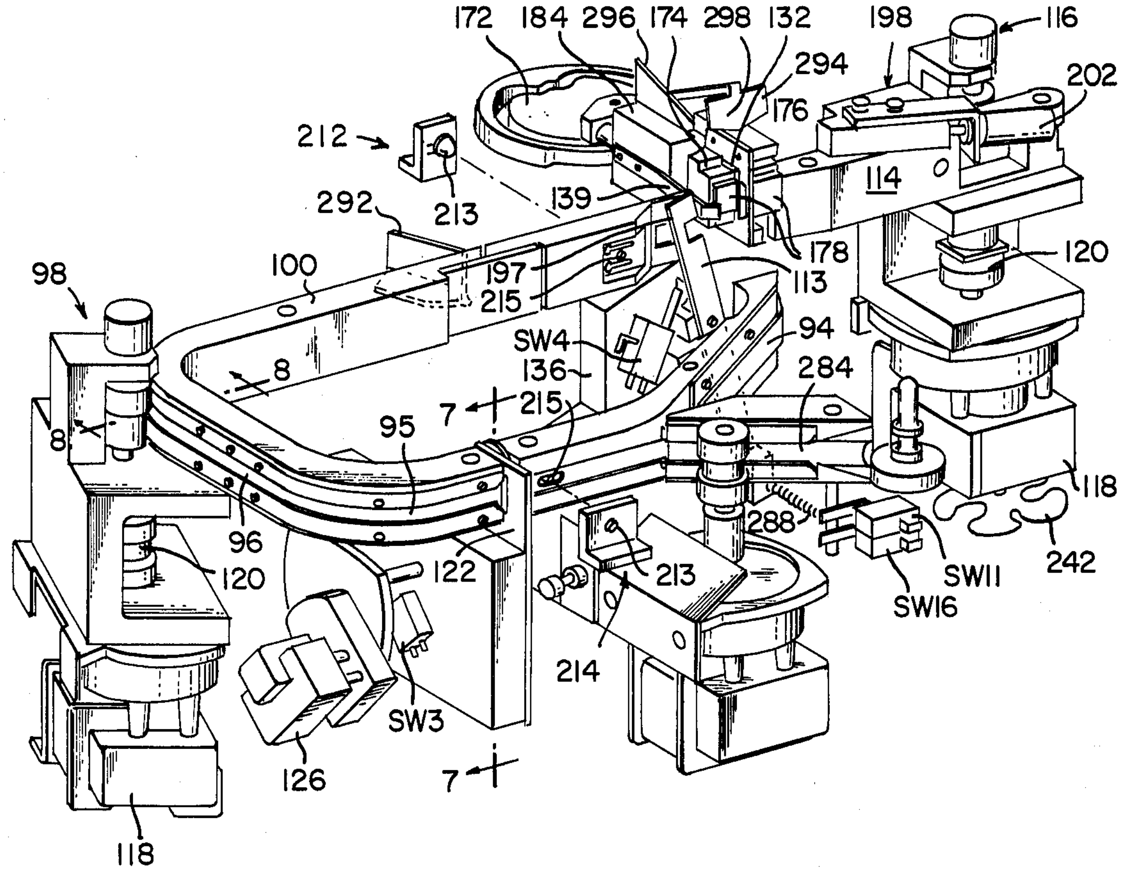
FIG. 9
FIG. 10
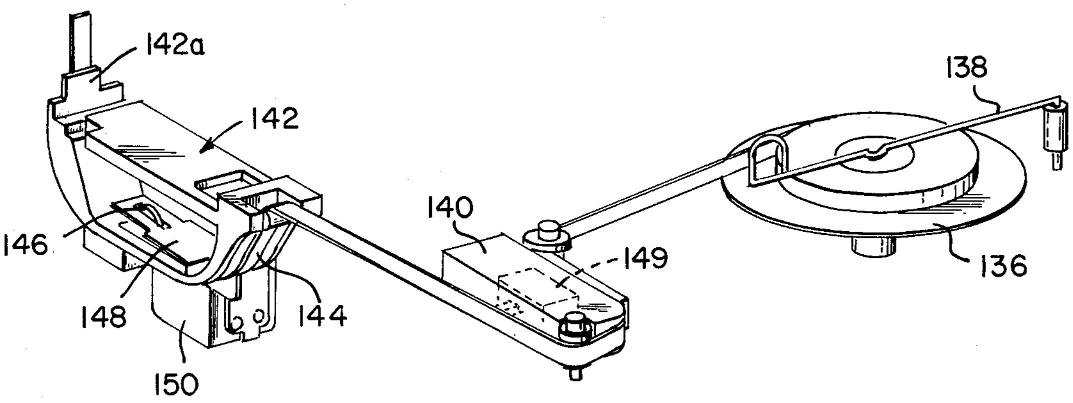

FIG. 11
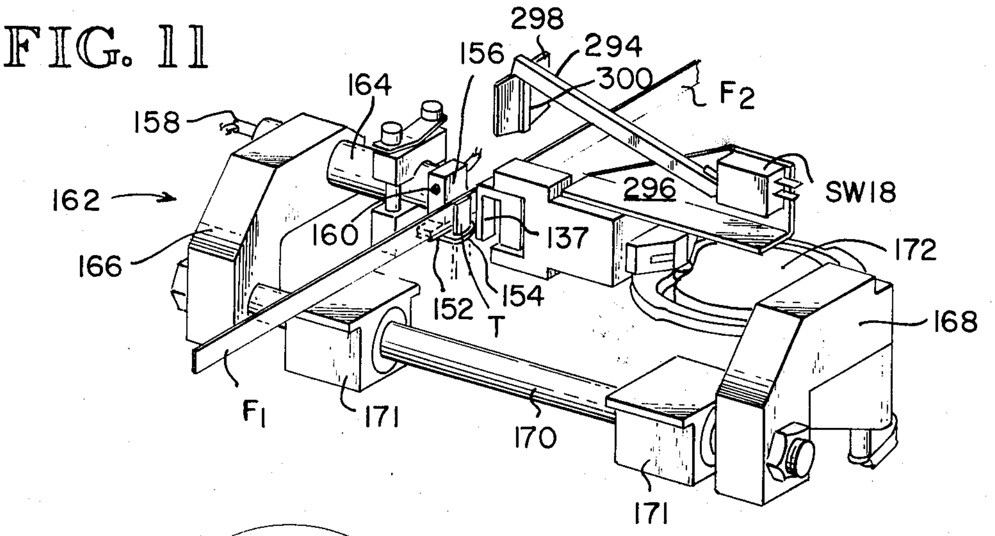
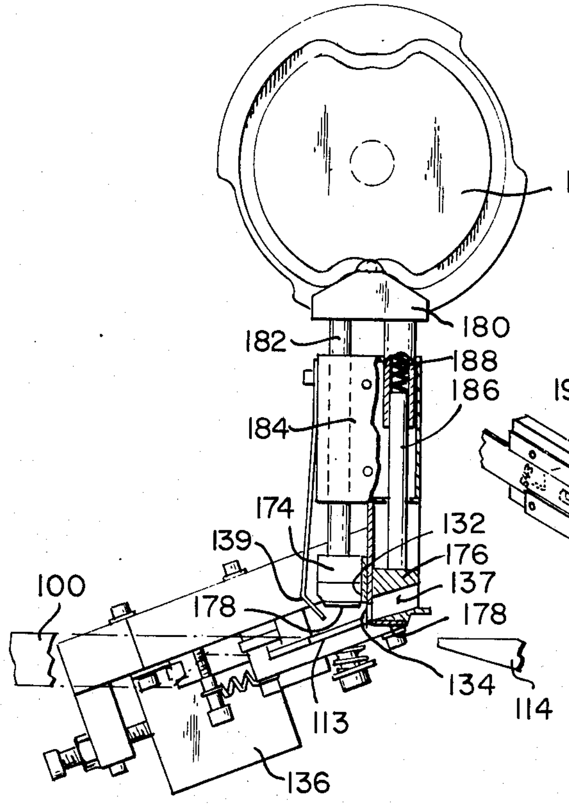
FIG. 12
FIG. 13
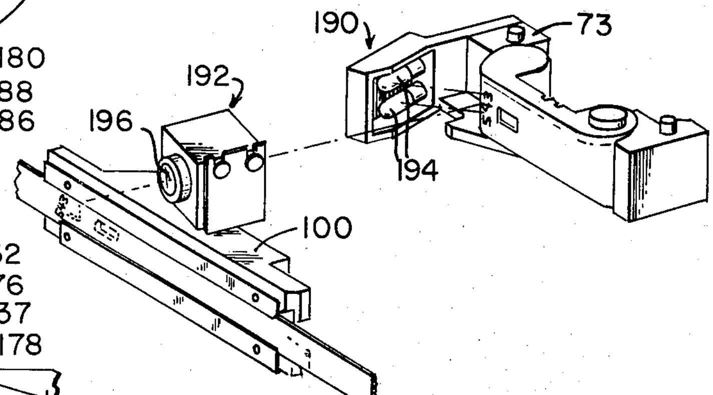
FIG. 14
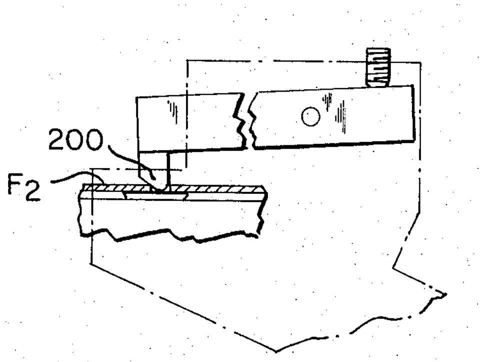

CARTRIDGE FILM UNLOADING AND SPLICING SYSTEM

This is a continuation of application Ser. No. 945,251, filed Sept. 25, 1978, now abandoned, which was a continuation of application Ser. No. 676,062 filed on Apr. 12, 1976, now abandoned.

BACKGROUND OF THE INVENTION

This invention relates to strip splicing and, more particularly, to film splicing. The invention is especially suited for unloading and splicing so-called "110" cartridge film; however, the invention may be adapted to unload and splice other types of cartridge film, or to splice other types of cartridge film, or to splice conventional roll film, or to splice tapes, ribbons, bands, elongated webs or generally similar strip materials for photographic and/or other applications.

Most commercial cartridge film processors manually open and unload each film cartridge and then manually feed each unloaded film strip into a splicer for splicing into a continuous film strip made up of several customers' film. Although the splicer typically is semi-automated, productivity of a splicing operation of this type is effectively limited by the rate at which the splicer attendant can open and unload each cartridge and then feed each unloaded film strip into the splicer.

SUMMARY OF THE INVENTION

This invention combines film splicing apparatus with means for unloading film from a film cartridge and then delivering the unloaded film to the splicing apparatus, means for discharging an empty cartridge, and means for dispensing a fresh cartridge for unloading.

According to one preferred embodiment of the invention, film cartridges are successively dispensed and delivered to an unloading station at which each cartridge is unloaded and then discharged. The unloaded film strips thus obtained are fed in succession from the unloading station to a splicing station at which they are positioned with their leading edges in adjacent end-to-end relation with the trailing edge of a preceding film strip for a time period sufficient for splicing apparatus located adjacent the splicing station to effect a splice between the adjacent strip edges. Prior to the splicing operation, however, the leading and trailing edges of each strip are cut. Upon completion of the splicing operation, the spliced film strips are fed away from the splicing station and each is positioned with its trailing edge at the splicing station for a time period sufficient to effect a splice with the leading edge of a succeeding strip.

Thus, it will be appreciated from the foregoing summary that this invention provides the commercial cartridge film processor with a highly economical system for unloading and splicing film. Using this invention, a number of film cartridges can be dispensed, unloaded, and discharged in succession, while the film strips extracted therefrom are spliced into a continuous strip for further processing—all automatically, if desired. The system further may be operated semi-automatically by manually feeding individual cartridges directly to the cartridge unloading means, or by manually feeding unloaded film strips directly to the film feeding means, or by manually feeding unloaded film strips directly to the splicing means. Although the splice preferably is constituted by a heat seal splice effected by applying a length of heat and pressure sealable tape to the adjacent strip ends, the splice could be constituted by other means. In most practical applications, especially unloading and splicing of "110" cartridge film, the system unloads and splices film strips of different lengths which correspond, for example, to 12 and 20 exposure film and identifies each film strip by photographically transferring an identification number from the cartridge to the film strip. This invention, therefore, provides an economical yet highly effective cartridge film unloading and splicing system especially suited for unloading and splicing "110" cartridge film.

These and other features, objects, and advantages of the present invention will become apparent in the detailed description and claims to follow taken in conjunction with the accompanying drawings in which like parts bear like reference numerals.

BRIEF DESCRIPTION OF THE DRAWINGS

FIG. 1 is a perspective view of the cartridge film unloading and splicing system of this invention;

FIG. 2 is a plan view of the FIG. 1 system with parts broken away;

FIG. 9 is a fragmentary perspective view of the film feeding and film cutting assemblies and a portion of the film splicing assembly of the FIG. 1 system;

FIG. 10 is a fragmentary perspective view of the splice tape subassembly associated with the FIG. 9 film splicing assembly;

FIG. 11 is a rear fragmentary perspective view of another portion of the film splicing assembly of the FIG. 1 system;

FIG. 12 is a plan view in additional detail of portions of the film feeding and splicing assemblies of the FIG. 1 system, with part of the film splicing assembly broken away;

FIG. 13 is a fragmentary perspective view of the film identification assembly of the FIG. 1 system;

FIG. 14 is a schematic depicting operation of the pitcher locator associated with the film feeding assembly of the FIG. 1 system;

DETAILED DESCRIPTION OF THE DRAWINGS

Figure 3:
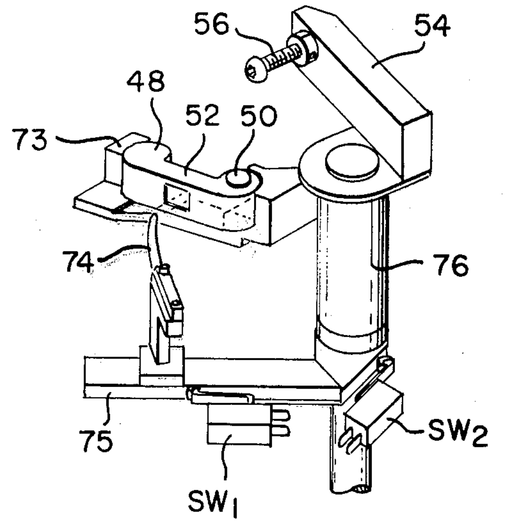
FIG. 3 is a fragmentary rear perspective view of a portion of the film extraction assembly and a portion of the cartridge dispensing assembly of the FIG. 1 system.
Figure 6:
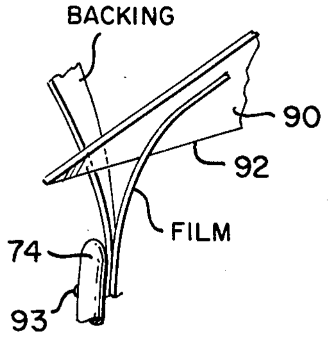
FIG. 6 is a schematic depicting operation of the film extraction assembly of FIGS. 3 and 4 in additional detail.
Figure 4:
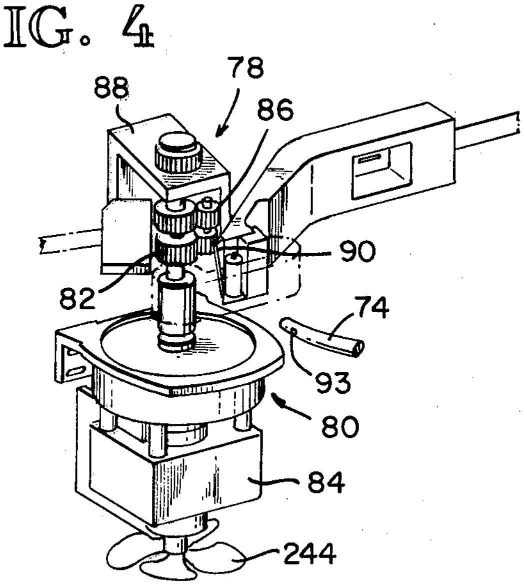
FIG. 4 is a fragmentary rear perspective view of another portion of the film extraction assembly and a portion of the film feeding assembly of the FIG. 1 system.

The fully automated cartridge film unloading and splicing system of this invention is illustrated in perspective view in FIG. 1. In this example, the system components are housed within or mounted by a wheeled equipment vehicle 10. This vehicle pivotally supports an inclined deck 12 which mounts most of the system assemblies and ancillary apparatus, with the exception of electronic controls and control circuitry which are contained within or mounted by the body of the vehicle. In one example, electronic circuitry is formed on printed circuit cards (not shown) which are mounted within a drawer 14, the circuitry being controlled by external operator controls 16 and 18. The deck may be pivoted by means not shown with respect to the vehicle so that it can be lifted or rotated to provide access to the underside thereof and to the interior of the vehicle for purposes of servicing, adjustment, etc., of the various system components mounted underneath the deck or within the vehicle. To facilitate such movement of the deck, a handle 20 upstanding from the outer deck surface, may be provided, if desired. The assemblies which constitute the FIG. 1 system are illustrated in additional detail in FIGS. 2-18.

Figure 17:
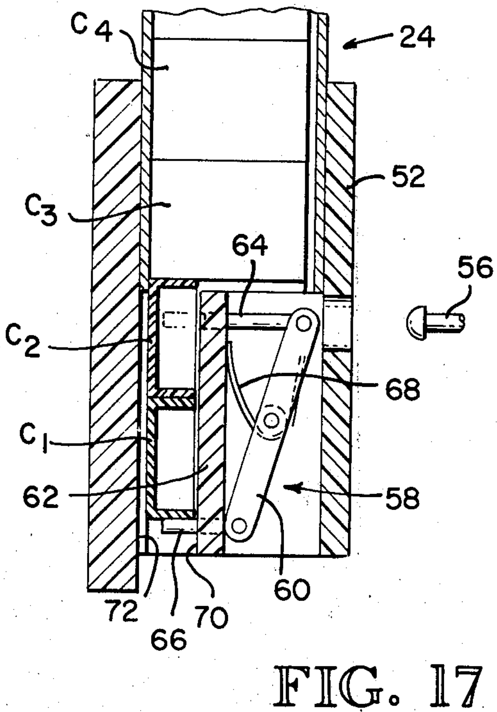
FIG. 17 is a section taken along the line 17—17 in FIG. 16.
Figure 18:
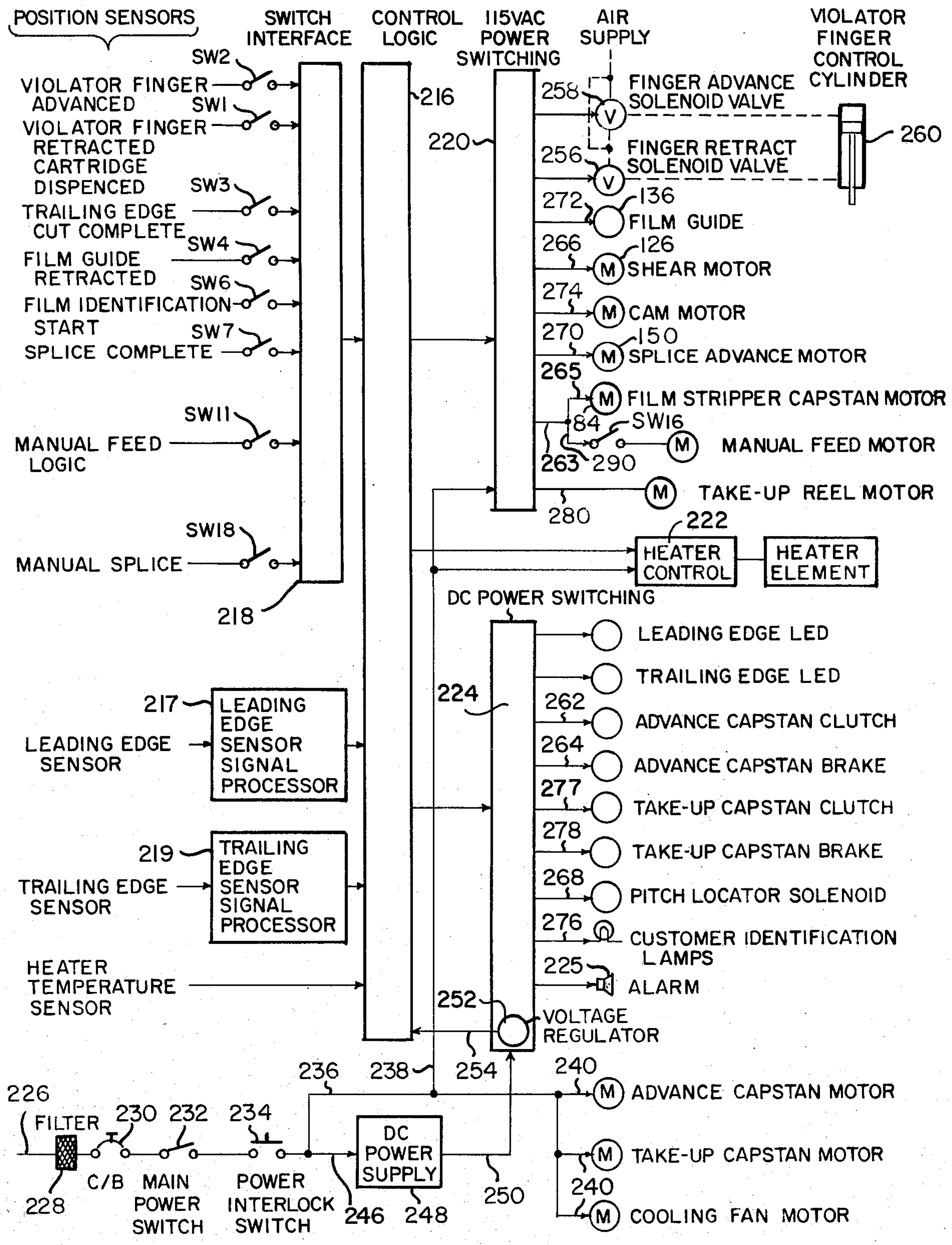
FIG. 18 is a circuit schematic of the electrical control system of the FIG. 1 system.

The automated cartridge film unloading and splicing system of this invention is made up of a cartridge dispensing assembly (FIGS. 2, 3, and 15-17), a film extraction assembly (FIGS. 2-6), a film feeding assembly (FIGS. 2, 8, 9, 12, and 14), a film cutting assembly (FIGS. 2, 7, 9, 11, and 12), a film splicing assembly (FIGS. 2 and 9-12), a film identification assembly (FIGS. 2 and 13), a film take-up assembly (FIG. 2), and an electronic control system (FIG. 18). The cartridge dispensing assembly (referenced generally by numeral 22 in FIG. 2) includes a removable cartridge magazine 24 (see FIG. 1), from which individual film cartridges are delivered in succession to an unloading station underlying the lower end of the cartridge. The film extraction assembly (referenced generally by numeral 26 in FIG. 2) is located adjacent the unloading station and, in response to delivery of a fresh cartridge to the unloading station, extracts the film strip from the delivered cartridge. This assembly later discharges the empty cartridge after completion of the film identification operation. The film feeding assembly (referenced generally by numeral 28 in FIG. 2) receives the extracted film and feeds it clockwise, as illustrated, about a generally U-shaped run $R_1$ extending from the unloading station to a splicing station and positions the leading edge of the film strip at the splicing station in adjacent end-to-end relation with the trailing edge of a preceding film strip for a time period sufficient for the splicing assembly (referenced generally by numeral 30 in FIG. 2) to effect a splice therebetween. Prior to effecting the splice, however, the film cutting assembly, which includes a trailing edge cutter 32 (FIG. 2) and a leading edge cutter 34 adjacent the splicing station, effects trailing and leading edge cuts—simultaneously or sequentially, depending upon the length of the film strip. The FIG. 18 control system senses the length of the film strip and controls system operation in accordance with strip length as will be described presently. The splicing assembly 30 applies a length of heat and pressure sensitive splicing tape to the adjacent strip edges at the splicing station to effect a splice therebetween, while simultaneously therewith the film identification assembly transfers a customer identification number from the cartridge now present at the unloading station to the leading edge portion of the film strip now present at the splicing station—this film strip being the same strip just unloaded from the cartridge. Upon completion of the splicing and the film identification operations, the cartridge is discharged and a fresh cartridge is delivered to the unloading station. At the same time, the now-spliced film strips (i.e., the just unloaded film strip and the preceding film strip) are fed along a second run $R_2$ extending away from the splicing station to the take-up assembly 38 (FIG. 2) and partially wound onto a take-up reel 40 under controlled tension until the trailing edge of the just-spliced film strip is positioned at the splicing station in preparation for a splice between it and the leading edge of the suceeding strip contained in the just-delivered cartridge.

Referring again to FIG. 1, a housing 42 is secured to the periphery of the film feeding assembly and encloses the film extraction and identification assemblies 26 and 36. A housing 44 upstanding from deck 12 encloses the film splicing assembly 30 and the leading edge cutter 34. A housing 46 also upstanding from deck 12 encloses the trailing edge cutter 32. These housings serve to protect the system components from contamination, dust accumulation, etc. The illustrated housing 42 further traps light generated by the film identification assembly and prevents it from reaching film wound upon the take-up reel, and the surrounding environment.

The FIG. 1 system is especially suited for automatically unloading and splicing so-called "110" cartridge film. A typical "110" cartridge is depicted in FIG. 3. It includes two generally cylindrical end portions 48 and 50 and an intervening transfer portion 52 which forms a square exposure aperture. Typically, "110" film (not shown) is made up of a film strip which includes appropriate marginal sprocket holes and a paper backing strip (not shown). After exposure in a camera and upon receipt by the film processor, these strips are wound together inside end portion 50 with a portion of the paper backing strip still contained inside end portion 48 and covering the exposure aperture.

A number of film cartridges of this type are stored within one or more magazines, each generally similar to magazine 24, at an appropriate location. As depicted in FIG. 1, a magazine, when loaded with a number of such cartridges, is positioned normal to the face of the deck and its lower or output end is inserted into a receptacle 52 which constitutes part of the cartridge dispensing assembly. The cartridges are then gravity fed, unloaded, and discharged in succession through an opening (not shown) in deck 12, all automatically. Prior to such discharge, however, the customer identification number of each cartridge is photographically transferred to the leading edge of its respectively associated film strip, as will be described presently. Consequently, the discharged cartridges may now be discarded and need not be retained during the remainder of the film processing. It will be recognized, of course, that the FIG. 1 system may be adapted to automatically unload and splice other types of cartridge film.

Figure 15:
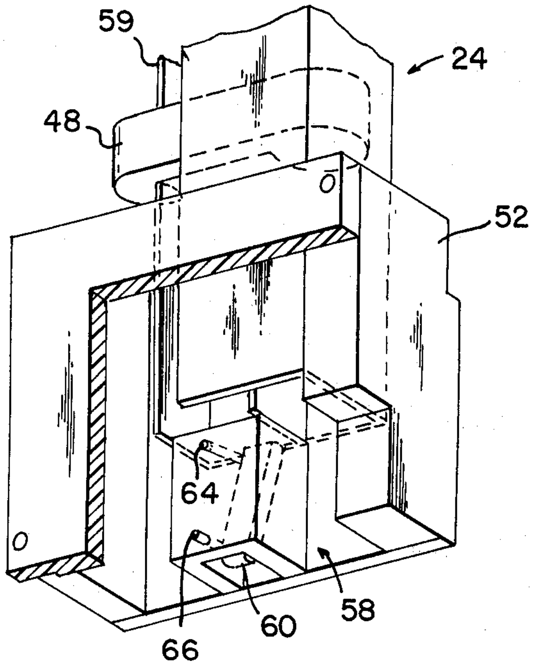
FIG. 15 is a rear fragmentary perspective view of the cartridge dispensing assembly of the FIG. 1 system with parts broken away.

Referring now in particular to FIGS. 1-3, and 15-17, the illustrated cartridge dispensing assembly includes a cartridge actuator (FIGS. 1-3), for actuating a cartridge feed assembly (FIGS. 15-17) associated with receptacle 52, and a magazine 24 for storing and dispensing cartridges in succession. The receptacle 52 is upstanding from deck 12 as shown (FIG. 1). A powered actuator arm 54 (FIGS. 1–3) is mounted adjacent the receptacle for rotational movement about a generally vertical axis (or axis perpendicular to the face of deck 12), the arm being powered by an appropriate double acting reciprocative air cylinder (not shown) under control of the FIG. 18 circuit, as will be described presently. A probe 56 (FIG. 3) projects perpendicularly from the end of the actuator arm and is insertable into an opening in the receptacle for dispensing a cartridge. The cartridge feed assembly is responsive to such insertion of probe 56 and is most clearly illustrated in FIGS. 15–17 in which it is generally referenced by numeral 58. FIG. 15 is taken from a rear viewpoint or opposite the FIG. 1 viewpoint. (The terms "forward" and "rear" are used hereinafter refer to opposed viewpoints with respect to the FIG. 1 system—the "forward" and "rear" edges of deck 12 designated by letters F and R respectively in FIG. 2.)

Figure 16:
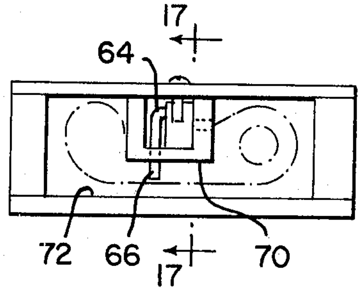
FIG. 16 is a top plan view of the FIG. 15 cartridge dispensing assembly.

The magazine 24 of FIGS. 15–17 has a rectangular outline which substantially registers with the interior outline of the receptacle 52. The left rear corner portion of the magazine is cut away in order to allow portion 48 of each cartridge to overlap sidewall 59, and project from that side of the magazine, as shown (FIG. 15). Assembly 58 engages and positions magazine 24 within receptacle 52 such that cartridges stacked on edge within the magazine register with assembly 58 as shown (stacked cartridges designated $C_1$, $C_2$, $C_3$, and $C_4$ in FIG. 17).

The assembly 58 of FIGS. 15–17 includes a rocker arm 60 pivotally supported intermediate its length by a support bracket 62 mounted by receptacle 52 to swing in a vertical plane. The upper end portion of the rocker arm is aligned with the receptacle hole so that, upon insertion of the probe 56, the rocker arm will be moved in a counterclockwise direction (as illustrated in FIG. 17). Upper and lower actuator pins 64 and 66 are respectively mounted pivotally by the ends of the rocker arm and project through respective holes in the bracket 62. Spring 68, acting between the arm 60 and the bracket 62, continuously biases the arm in a clockwise direction such that the lower pin 66 normally projects through its respective hole into a position blocking the cartridge passageway between the bracket outer surface 70 and the opposite receptacle inner surface 72 (see FIGS. 16 and 17), whereas the upper pin 64 normally is retracted. As shown in FIGS. 16 and 17, this passageway corresponds in width to the width of cartridge portion 52 (FIG. 3) and is of sufficient length that at least two cartridges $C_1$ and $C_2$ can be stacked sideways therein. Upon contact with the inserted probe 56, however, the rocker arm is rotated against the bias of the spring in a counterclockwise direction (FIG. 17) until the upper pin 64 is extended into and blocks the cartridge passage and the lower pin 66 is retracted. In this position of arm 60 therefore, the lower cartridge $C_1$ is free to drop by gravity out the lower end of the cartridge passageway while the upper cartridge $C_2$ engages and is retained within the passageway by the upper pin 64. Upon retraction of probe 56, of course, arm 60 is swung back to its FIG. 17 position at which pin 64 engages and retains cartridge $C_2$, pin 64 being retracted to permit cartridge $C_3$ to drop onto cartridge $C_2$. Thus, a number of cartridges may be dispensed in succession in response to alternate insertion and withdrawal of probe 56. Each cartridge thus dispensed drops a short distance through the receptacle 52 and thence is received by a cartridge retainer 73 (FIG. 3) associated with the film extraction assembly. The receptacle preferably is so constructed and arranged that it provides appropriate guidance and maintains alignment of each cartridge during travel thereof to the film extraction assembly.

Referring now in particular to FIGS. 2–6, the film extraction assembly pulls the film strip and paper backing strip from the film cartridge and then strips or separates the backing strip from the film strip. The backing strip is then discharged, and the film strip is delivered to the film feeding assembly to be described presently. (The film extraction assembly is viewed from the rear in FIGS. 3–6.) The film extraction assembly includes a cartridge violator and a film stripper assembly. The violator is constituted by an elongaged blunt-end violator finger 74 mounted by a support arm 75. The finger is circular in cross section. The finger also is of arcuate configuration along its length so that it can be swung into the square cartridge image aperture located between the cyclindrical cartridge end portions 48 and 50 (FIG. 3). The finger 74 and the aforementioned probe 56 are mounted for conjoint rotational movement with respect to the vertical pivot axis of shaft 76 and, therefore, are positioned at their advanced and retracted positions with respect to the cartridge and the magazine in alternate sequence. The stripper assembly 78 (FIGS. 4 and 5) is located in front of the cartridge retainer 73 in horizontal alignment with the path of the movement of the violator finger. The stripper assembly includes a stripper capstan 80 made up of a stripper roller 82, powered by a stripper motor 84, and an idler roller 86, both rollers being mounted by a bracket 88 upstanding from the deck in. The stripper assembly further includes a stripper member 90 which strips or separates the backing strip from the film strip during cartridge unloading as will now be described.

Figure 5:
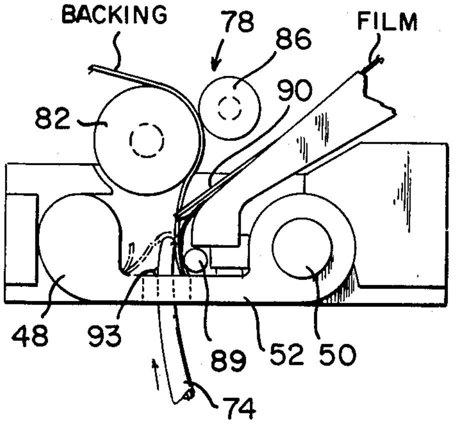
FIG. 5 is a schematic depicting operation of the film extraction assembly of FIGS. 3 and 4.
Figure 8:
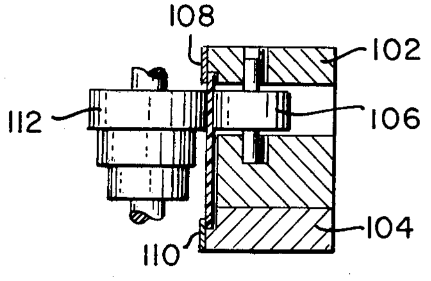
FIG. 8 is a section taken along the line 8—8 in FIG. 9.
Figure 7:
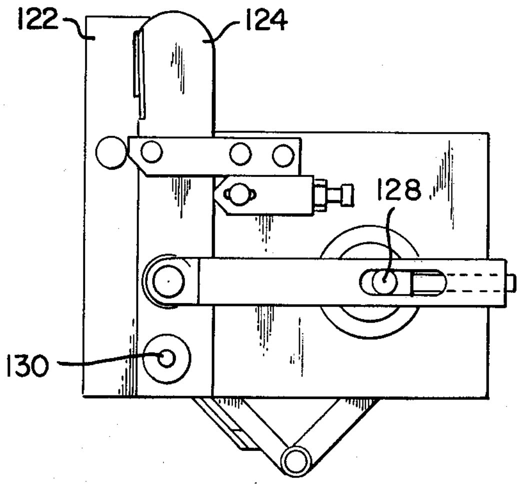
FIG. 7 is a section taken along line 7—7 in FIG. 9.

As depicted schematically in FIG. 5, as the finger 74 is inserted into and projects through the cartridge aperture, it engages and pulls the end portion of the paper backing strip from the cartridge chamber 48. With continued advancement of the finger in the direction indicated by the arrow, the backing strip contacts and is drawn by the powered stripper roller 82 between it and the idler roller 86, as depicted by the small arrows in FIG. 5. Just prior to engagement of the backing strip with the stripper rollers, however, the film strip, which was previously wound within the cartridge chamber 50, begins to be drawn out of that chamber and curves about a second idler roller 89 by the force applied by the backing strip as the latter is drawn out of the cartridge by the finger 74. The backing strip and film strip are separated from one another during these initial phases of the film extraction operation. This separation process is accomplished by the flat stripper member 90 (FIGS. 4–6) which includes an inclined rear surface 92 located adjacent the path of movement of the violator finger. The inclination and location of rear surface 92 with respect to the path of movement of the violator finger are such that the upper edge portion of the backing strip engages and is curved about the curved side surface of the violator finger, shown in FIG. 6, as the latter projects through the cartridge aperture as previously described with reference to FIG. 5. Consequently, the face of the backing strip is curved relatively away from the opposing face of the film strip (in this case the emulsion face) about a line substantially parallel to the length of the backing strip commencing at the upper edge thereof as the two strips approach and pass by the stripper member. Thereupon the backing strip is caused to pass along one side of the stripper member and be dischardged via rollers 82 and 86, while simultaneously therewith the film strip passes along the opposite side of the stripper member towards an in-feed track associated with the film feed assembly, as shown (FIG. 5). This in-feed track, together with the stripper member, are located such that the natural curvature of the film strip further tends to cause it to separate from the backing strip at a point corresponding to the location of the inclined surface 92 and, in this way, aids in the separation of the backing and film strips.

The extraction assembly further discharges the empty cartridge. The finger 74 includes a detent 93 (FIGS. 4 and 5) adjacent its blunt end. This detent is of sufficient size that upon insertion of the finger through the cartridge opening, it engages the portion 52, as shown (FIG. 5). Consequently, as the finger is retracted, the cartridge is removed from the retainer 79. Upon further movement of the finger toward its retracted position of FIG. 2, the cartridge engages and is held stationary by two spaced apart stops 99 (FIG. 2) upstanding from deck 12 adjacent a discharge opening 97. As the finger completes its retractive movement, therefore, the cartridge is disengaged from detent 93 and drops through opening 97.

The film feeding assembly will now be described with specific reference to FIGS. 2, 8, 9 and 14. The film strip, upon extraction from the cartridge as described previously, is fed by the film feeding assembly along a generally U-shaped run from the unloading station to the splicing station. The action of the stripper capstan advances the leading edge of the film strip in an inclined direction along the in-feed track 94 (FIGS. 2 and 9), then along a forward feed track 95 past the trailing edge cutting assembly cutting station presently to be described, and thence in a generally perpendicular direction along an intermediate feed track 96. A film advance capstan 98 located adjacent the intermediate feed track then engages and continues to feed the film strip along a rear feed track 100 at a feed rate corresponding to the feed rate imparted to the film strip by the stripper capstan. The feed track 100 terminates at the splicing station. The film advance capstan 98 is located at such a distance along the run extending from the unloading station that the leading edge of the film strip reaches the advance capstan prior to completion of the film extraction process, thereby insuring that the film strip will be advanced continuously along the feed tracks 94, 95 and 96. Likewise, the advance capstan is located at such a distance from the splicing station that it maintains engagement with and, hence, controls the position of the leading edge of the film strip with respect to the splicing station. Although the feed assembly feeds the film strip along a generally U-shaped run, it could be fed along a rectilinear run, for example, provided appropriate spacing between the unloading and splicing stations, between the stripper and advance capstans, and between the cutting stations (to be described presently) are maintained. The U-shaped run is preferred, however, in those applications in which the film identification assembly, also to be described presently, is employed.

The feed tracks 94, 95, 96 and 100 are generally similar. A portion of feed track 96 adjacent the advance capstan is illustrated in cross section in FIG. 8, it being understood that the remaining feed tracks are generally similar. The illustrated portion of the feed track 96 includes two vertically spaced apart, parallel track members 102 and 104, which include outer relief cuts adapted to receive and engage the upper and lower edges of the back or non-emulsion bearing face of the film strip, respectively. An inner idler roller 106 is mounted between these members for rotational movement about a vertical axis and is of sufficient diameter that it engages and positions the back face of the film strip. Upper and lower generally coplanar film retention strips 108 and 110 are respectively mounted by the upper and lower track members and overlap the edge portions of the emulsion bearing face of the film strip. The extent to which the retention members overlap the film strip, however, should be minimized so that they do not overlap the image-bearing portion of the film strip adjacent the center thereof. Still referring to FIG. 8, the advance capstan 98 includes a relieved drive roller 112 adapted to engage only the upper edge portion of the emulsion bearing face of the film strip. This roller includes a relieved mid-portion which opposes the image bearing area of the film strip. Thus, it is possible, by preventing contact by either the film retention members, or the capstan roller, with the image bearing area of the film strip to minimize or substantially eliminate scratching or other damage to that area of the film strip during the feeding operation.

The feeding assembly further includes a film guide assembly (referenced generally by numberal 113 in FIG. 2) adjacent the splicing station, for guiding the leading edge of each film strip into proper position for cutting and splicing, and an out-feed track 114 which directs the film along a generally rectilinear run $R_2$ extending relatively away from the splicing station and terminating adjacent the film take-up assembly. Track 114 is generally similar to tracks 94, 95, 96 and 100. A take-up capstan 116 (FIGS. 2 and 9) located adjacent the out-feed track advances the spliced strips toward the take-up assembly (or to the right as illustrated in FIG. 2).

The advance and take-up capstans 98 and 116 are generally similar, except that the take-up capstan drive roller (not shown) is adapted to engage both edge portions of the film strip. Referring to FIG. 9, each capstan includes a continuously operating drive motor 118, a drive roller (advance capstan drive roller already described with reference to FIG. 8), and an electrically actuated clutch and brake mechanism 120 therebetween, the latter being controlled by the FIG. 18 circuit, as will be described presently. As will be appreciated, by continuously operating the advance and take-up drive motors, it is possible to obtain substantially instantaneous drive speed at the advance and take-up rollers, thereby providing positive and accurate control of film movement and positioning. The take-up capstan preferably advances the film at a greater rate than the advance capstan so that, upon completion of the splice, the spliced film strips, especially the film strip present in feed tracks 95, 96 and 100, will not collide with the next to be extracted film strip. Although the stripper capstan 80 of FIG. 4 also could include a generally similar clutch assembly, in most practical cases, it is able to reach desired speed by the time the violator finger pushes the backing strip into contact therewith; therefore, in most practical cases, the stripper capstan motor is operated intermittently and is directly connected to the powered stripper roller.

The film cutting assembly is most clearly illustrated in FIG. 9 of the drawings. It includes a trailing edge cutter assembly located adjacent track 95 and a leading edge cutting assembly located adjacent the splicing station. Referring first to the trailing edge cutter assembly (see also FIG. 7), that assembly includes a fixed shear blade 122 and a motor driven moveable shear blade 124. The fixed blade includes an elongated aperture through which the film strip is guided by track 95 and positioned selectively by the advance capstan for effecting trailing edge cut. The cut is effected by energizing the shear motor 126 which rotates the blade 124 across the fixed blade aperture through an eccentric 128 (FIG. 7) about a rotational axis defined by shaft 130 (FIG. 7) substantially parallel to the direction of feed along track 95. The motor 126 may include a brake for stopping further movement of the blades upon completion of the cut.

The leading edge cutter of FIGS. 9, 11 and 12 is located adjacent the splicing station and is actuated simultaneously with actuation of the splicing assembly, the latter to be described presently. The leading edge cutter, like the trailing edge cutter, includes a moveable shear blade 132 and a fixed shear blade 134. The moveable shear blade is mounted for conjoint movement with the splicing assembly, specifically the splicing assembly pressure application means, and is thus moved reciprocatively between an advanced cutting position and a retracted loading position. The fixed blade is mounted by deck 12 and includes an elongated aperture most clearly illustrated in FIG. 9.

The aforementioned film guide 113 engages and guides the leading edge of each film strip through this aperture. The film guide is of an elongated substantially flat configuration and is pivoted about its lower end for movement in a generally vertical plane in a direction inclined to track 100. It is alternately positioned at an advanced position (FIG. 12) intersecting track 100 and a retracted position (FIG. 9) averted therefrom by an operator mechanism 136 adjacent its lower end. As most clearly shown in FIG. 12, the splicing assembly includes an open ended channel 137 for receiving the end portion of the film strip which projects beyond blade 134. To prevent undesirable curling of the film strip as it is guided by guide 113, a resilient finger 139 (FIG. 12) may be secured to the splicing assembly with its end so positioned that it engages and prevents curling of the incoming leading edge portion of the film strip as the latter engages and is guided by the film guide.

The film splicing assembly will now be described with reference to FIGS. 9–12. The film splicing assembly effects a heat seal splice between a pair of adjacent film strip ends, specifically between the leading edge of the just-unloaded film strip and the trailing edge of the preceding flim strip (respectively referenced by letters $F_2$ and $F_1$ in FIG. 11—a rear perspective view) by applying a length of heat and pressure sensitive splicing tape therebetween to form a spliced film joint. The splicing assembly includes a pressure application subassembly (FIGS. 9, 11, and 12), a heat application subassembly (FIG. 11), a splice tape feed subassembly (FIG. 10), and a splice tape cutting subassembly (FIG. 11).

Referring first to the splice tape feed subassembly of FIG. 10, a roll of splice tape is mounted by a reel on the deck (see also FIG. 2) and is retained thereon by a resilient retainer 138. Splice tape unwound from the roll is fed to a splice tape guide 140 which routes splice tape along a generally U-shaped run and delivers it to a splice tape feed mechanism 142. The feed mechanism 142 routes the splice tape underneath the deck and associated surface mounted components along a generally U-shaped run, and delivers it to the splice tape cutting subassembly which will be described presently. As shown in FIG. 10, the splice tape is twisted partially as it is fed from guide 140 to mechanism 142 so that, upon appearing at the outfeed end **142*a* of mechanism 142, it is in substantially coplanar alignment with and perpendicular to the adjacent film strip ends (see FIG. 11, tape referenced by letter T). The mechanism 142 includes a generally U-shaped feed track 144 generally similar to feed tracks 94, 95, 96, 100 and 114 for directing the tape between an idler roller 146 and a motor driven drive roller (not shown). The idler roller is spring biased by a leaf spring 148 into engagement with the splice tape to maintain desired engagement thereof with the drive roller. The drive motor 150 is operated intermittently for time intervals sufficient to cause a predetermined length of tape to be delivered to the cutting subassembly. The guide may include a sensor 149** for sensing and indicating by means not shown that the supply of splice tape is exhausted.

The splice tape cutting subassembly of FIG. 11 includes a fixed shear blade 152 and a movable shear blade 154. The fixed shear blade includes an elongated aperture (see also FIG. 2) into which splice tape is inserted from the outfeed end **142*a* of the tape feed mechanism 142. To effect a cut, the movable shear blade 154** is movable conjointly with the heat application subassembly, next to be described, across the fixed blade aperture.

The heat application subassembly of FIG. 11 includes a heat seal platen 156 (see also FIG. 2) which includes an electric heater supplied with electrical power by appropriate leads 158. A temperature sensor 160, such as a thermistor, is positioned within or in contact with platen 156 and senses the temperature thereof as part of the FIG. 18 heater control circuit. The platen 156 is mounted for reciprocative movement perpendicular to the faces of the adjacent film strips $F_1$ and $F_2$, and tape T (FIG. 11), by an actuator generally referenced 162. The actuator 162 includes a platen support member 164, two opposed generally L-shaped connecting members 166 and 168, and a connecting rod 170 therebetween. The connecting rod is mounted by two journal blocks 171 underneath the deck (see FIG. 2) for reciprocative movement. A cam follower 170 fixed to member 168 engages a control cam 172, as shown (FIG. 2). This cam controls the splice tape cutting, heat application, and pressure application subassemblies, together with the leading edge cutter.

The pressure application subassembly of FIGS. 9, 11 and 12 includes a sectional pressure head made up of two movable pressure heads 174 and 176, each terminating in a pressure platen 178. Head 174 supports movable film strip cutting blade 132, fixed blade 134 being located between heads 174 and 176, as shown (FIG. 12). Head 176 forms the aforementioned channel 137 (refer again to FIG. 12). As most clearly shown in FIG. 12, the head 174 is directly connected to a cam follower 180 by a single shaft 182 extending through a support block 184 upstanding from deck 12. Head 176 also is supported by block 184 but is connected to the cam follower 180 by a sectional shaft 186 and a telescopic spring biased lost motion connection 188. Thus, as the cam is rotated in a clockwise direction from the dwell position of FIG. 12, cam follower 180 will cause shafts 182 and 186 to advance; however head 174 will advance initially at a greater rate than that of the head 176 due to lost motion in shaft 186 produced by contraction of connection 188. Upon full contraction of connection 188, of course, both heads will advance conjointly and at the same rate; therefore, it is possible, by selecting an appropriate lost motion connection while staggering the retracted position of heads 174 and 176, as shown (FIG. 12), to provide sufficient relative motion between the two heads that their platens 178 are brought into coplanar alignment and simultaneously contact the film strips at their fully advanced positions. It is during this interval of relative movement between heads 174 and 176 that the leading edge cut is effected as the head 174 advances blade 132 past the elongated aperture in the fixed blade 134.

Thus, with two film strips $F_1$ and $F_2$ positioned in adjacent end-to-end relation and the splicing tape T positioned adjacent their ends and substantially perpendicular thereto as depicted in FIG. 11, clockwise rotation of the cam 172 from the illustrated dwell position will first cause the pressure head 174 to advance while head 176 initially remains relatively stationary during contraction of connection 188. Such movement of the pressure head 174 effects leading edge cut of the just-unloaded film strip $F_2$. The severed end portion of strip $F_2$ drops out the opposite end of channel 137 while simultaneously therewith the main body of the strip $F_2$ with the now cleanly severed leading edge moves, by virtue of its natural curvature, into contact with the splice tape T and into coplanar alignment with preceding strip $F_1$. The heat seal platen 156 is moved simultaneously by actuator 162 in a direction opposite to that of the pressure heads and effects severance of the splice tape at or about the time of film severance, the length of severed splice tape substantially corresponding to the width of the film strips $F_1$ and $F_2$. Further clockwise movement of the cam causes the severed splice tape and adjacent strip ends to be compressed together under heat and pressure applied by the pressure head and heat seal platen for a time interval sufficient to effect a splice between the adjacent film strip ends. The heat seal platen and pressure heads thereafter are drawn apart as the cam returns to its illustrated dwell position in which cam followers 170 and 180 encounter opposed dwell portions of the cam track (see FIG. 2).

Referring now to FIG. 13, the film identification assembly photographically transfers a customer identification number from the empty cartridge still located at the unloading station to the leading edge of the film strip extracted therefrom and now positioned at the splicing station. The film identification assembly includes a light source 190 located adjacent the unloading station and a camera 192 located adjacent the splicing station. The light source is comprised of one or more flash lamps 194 which direct a flash of light toward the indicia or number bearing portion of the cartridge, as shown (FIG. 13). The camera includes a lens 196 which receives the illuminated image of the cartridge indicia and focuses it upon the leading edge of the film then present at the splicing station via an opening 198 in track 100, (see FIG. 9). It is this light flash that is contained or shielded by the cover 42 of FIG. 1 in order to prevent light from escaping into the darkened processing room and prematurely exposing the film strips being processed.

To maintain proper pitch between the sprocket holes of the adjacent film strips at the splicing station, a pitch locator 198 adjacent track 114 may be provided. The pitch locator is illustrated in FIGS. 2, 9, and 14 and includes a pawl member 200 (FIG. 14), the position of which is controlled by a solenoid 202 (FIGS. 2 and 9) in response to electrical signals from the FIG. 18 circuit. The solenoid exerts a retractive force upon the pawl member in a direction inclined to track 114. This force causes the pawl member to engage an adjacent sprocket hole of the preceeding film strip $F_1$ and thus positively positions that strip with respect to the leading edge of the succeeding or just-unloaded strip $F_2$ so that, upon completion of the splice therebetween, the pitch or spacing between their respective sprocket holes correspond.

Referring again to FIG. 2, the take-up assembly 38 winds the spliced film strips onto a take-up reel 204 under controlled tension. The film is threaded between three stationary guides 206 and two movable guides 208 mounted by a pivotally movable tension arm 210. The tension arm is adapted to swing in a plane parallel to the face of the deck and is biased by means not shown to maintain a desired tension on the film to prevent jerking or snapping thereof. The take-up reel 204 is powered by a separate take-up motor (not shown) which may include an electrically operated brake assembly controlled by the FIG. 18 circuit in accordance with the position of arm 210.

Referring now to FIG. 18 of the drawings, the electronic control system of this invention is made up of a plurality of limit switch position sensors for respectively sensing the positions of selected system components described previously. These switches are illustrated in FIGS. 2, 3, and 9 and are depicted schematically in FIG. 18. The FIG. 18 control system further includes leading and trailing edge optical film strip sensors (generally referenced by numerals 212 and 214 in FIG. 9) and processing circuits 212 and 219 for sensing and providing electrical signals indicative of the presence or absence of a film strip in feed tracks 100 and 95 respectively. In the example each sensor is comprised of a source 213, preferably a light emitting diode (LED), and a receiver sensor spaced apart such that the film strip passes therebetween. The FIG. 18 system additionally includes a temperature sensor for sensing the temperature of the splicing heater. A control logic circuit 216 receives electrical signals from the switch position sensors via suitable interface circuits 218, from the leading and trailing edge sensors, and from the temperature sensor. This circuit further delivers appropriate output signals to an AC power switching circuit 220, a heater control circuit 222, or a DC power switching circuit 224. The control logic circuit in conjunction with the AC power switching circuit control operation of air supply valves associated with the violator finger control cylinder, the film guide operator, as well as the motors associated with the trailing edge cutter, cam 172, splice tape feeding subassembly, film stripper, manual feed assembly (to be described presently), and the take-up assembly. The control logic circuit further delivers appropriate control signals to a heater control circuit which, in turn, controls operation of the splice platen heater element. The control logic circuit in conjunction with the DC power switching circuit deliver appropriate output signals to the leading and trailing edge LED emitters, the advance capstan clutch and brake, the take-up capstan clutch and brake, the pitch locator solenoid, the film identification lamps, and an audible alarm 225.

The FIG. 18 electrical system is powered by alternating current electrical power delivered on input line 226, filtered by filter circuit 228, and then routed through a circuit breaker 230, a main power switch 232, and a power interlock switch 234. Alternating current present at the output terminal of the power interlock switch is delivered directly by line 236 and branch line 238 to the AC power switching circuit and by line 236 and branch lines 240 to the advance capstan drive motor, take-up capstan drive motor and a cooling fan motor. (The cooling fan motor is employed in most practical cases to drive a suitable cooling fan (not shown). Appropriate fans, of course, could be driven off the capstan drive motors, as indicated at 242 [take-up capstan", and 244 [stripper capstan" in FIGS. 9 and 4, respectively.) Alternating current electrical power further is delivered on line 246 from the switch 234 to a DC power supply circuit 248 which provides direct current electrical power. The latter is delivered by a line 250 to the DC power switching circuit which further includes a voltage regulator 252 for delivering reduced voltage direct current electrical power to the control logic circuit via line 254.

The FIG. 18 circuitry preferably is formed on appropriate printed circuit cards contained within drawer 14 of the vehicle housing. The power interlock switch 234 is closed and remains closed while the electronics drawer is closed. The voltage regulator 252 provides reduced voltage level direct current for operating the control logic circuit and may include means providing over-voltage protection, means for preventing ground loop current, etc. This regulator also controls operation of the solid state relays which make up the switch interface circuits 218. These relays sense AC voltage being switched by the position sensor-switches and perform switching functions to route sensor signals to the control logic circuit as the AC voltage passes through zero.

The leading and trailing edge sensors of FIG. 9 preferably are constituted by an infra-red emitting diode (emitter) and an infra-red photo-transitor (sensor-receiver). When film is present, the sensor is cut off and a nominal voltage appears at its output; however, when no film is present, the sensor conducts. Moving the leading or trailing edges of the film between each emitter and sensor-receiver pair, therefore, produces voltage level changes. The preferred "110" cartridge film further includes leading and trailing edge holes which, when moved with respect to the sensors, produce further voltage level changes, the latter of a predetermined time duration depending upon the size of the hole. The leading and trailing edge processor circuits respond to these voltage level changes and present appropriate electrical signals to the control logic circuit. Although optical sensors are employed in the illustrated system, other types of sensors could be employed, if desired.

Upon expiration of an appropriate time interval sufficient to allow the splicer heating element to reach operating temperature, the FIG. 18 control system determines whether any fault conditions exists, and, if appropriate, actuates the alarm 225 for producing an appropriate audible alarm signal indicative of the specific fault condition, and further inhibits splicer operation. If no fault conditions exists, the system causes the violator finger 74 to be moved toward its advance position by closing the retract solenoid valve 256 and opening the advance solenoid valve 258, thereby causing the violator finger control cylinder 260 to move toward its extended position. As the cartridge violator finger is moved toward its advanced position, switch SW-1 is opened and switch SW-2 (FIG. 3) is closed. Closure of switch SW-2 causes a violator finger advanced signal to be delivered to the switch interface circuit which then routes an appropriate signal to the control logic circuit. The control logic circuit thereafter delivers a command signal via the AC power switching circuit and lines 263, 265 to the film stripper capstan motor. Further advancement of the cartridge violator finger, therefore, causes the film strip to be extracted from the film cartridge and fed to the in-feed track 94 while simultaneously therewith the backing strip is separated from the film strip and discharged.

The leading edge portion of the film strip includes a hole (or equivalent indicator) which, when passed between the source and receiver-sensor of the trailing edge sensor 214 (see FIG. 9), triggers the trailing edge sensor signal processor circuit 219. The processor circuit 219, upon expiration of a predetermined time delay, delivers a signal indicative of the presence of a film strip in feed track 95 to the control logic circuit which then delivers an appropriate signal via the DC power switching circuit and line 262 for energizing the advance capstan clutch. The advance capstan, therefore, now quickly comes up to desired operating speed. The aforementioned time delay is selected to correspond to the time period required for the leading edge of the film strip to travel along feed track 96 from the location of the trailing edge sensor to about the location of the advance capstan.

The trailing edge portion of the film strip also includes a generally similar hole which, upon further advancement of the film strip, also passes the trailing edge sensor which, in combination with circuit 219, produces a second signal. At this point, the control logic circuit determines whether the leading edge sensor 212 has in fact also produced a signal corresponding to passage of the leading edge hole past the leading edge sensor. If leading edge sensor has in fact sensed the presence of the leading edge hole, the control logic circuit is set to handle a film strip of a first predetermined length; if not, it is set to handle a film strip of a second predetermined length. Preferably, the first predetermined length corresponds to the length of a 20 exposure film strip and the second predetermined length corresponds to the length of a 12 exposure film strip.

For the 12 exposure film strip condition, the control logic circuit upon expiration of a time period sufficient to cause the trailing edge of the film strip to be positioned properly adjacent the trailing edge shear assembly, delivers two signals via the DC power switching circuit and lines 262 and 264 which cause the advance capstan clutch to be disengaged and the advance capstan brake to be applied, thereby positively positioning the film strip in preparation for trailing edge cut. The control logic circuit further routes a signal via the AC power switching circuit 220 and line 266 for energizing trailing edge shear motor 126 to effect the trailing edge cut. Switch SW-3 (FIG. 9) is closed upon completion of the trailing edge cut and causes a cut complete signal to be delivered to the switch interface circuit 218 which routes that signal to the control logic circuit. The latter then causes the advance capstan to be restarted. The film strip is, therefore, advanced until the leading edge hole passes the leading edge sensor, at which point the leading edge sensor 212 (FIG. 9) in combination with circuit 217 produces a signal indicative of the presence of the film strip leading edge at that location. The control logic circuit then causes the advance capstan, upon expiration of a time period sufficient to cause the leading edge to be positioned properly adjacent the leading edge shear assembly, to be stopped and braked, thereby positioning the film strip in preparation for leading edge cut. At the same time, the control logic circuit delivers a signal via circuit 224 and line 268 to the pitch locator solenoid which, when energized, causes the pitch locator to engage an appropriate sprocket hole in the preceeding film strip, thereby bringing the preceding and succeeding film strips $F_1$ and $F_2$ into a proper pitch. Additionally, the splice tape motor of the FIG. 10 splice tape assembly is energized by a signal delivered on line 270 to advance an appropriate length of splice tape in preparation for effecting a splice.

In the event the 20 exposure film strip condition is established, the control logic circuit effects substantially the same operations, except that the leading edge of the film strip is immediately positioned at the splicing station without effecting the trailing edge cut and the trailing edge cut is performed simultaneously with the leading edge cut, as will now be described. To this end, the distance between the leading and trailing edge cutters is selected to correspond to the desired length of a 20 exposure film strip.

Upon presentation of the leading edge of the film strip at the splicing station, whether under the 20 or 12 exposure condition, the following operations take place. The control logic circuit delivers a signal via the AC power switching circuit and line 272 for causing the film guide operator to return the film guide to its retracted position. Switch SW-4 is closed in response to such retraction of the film guide and causes a film guide retracted signal to be delivered to the switch interface circuit which then routes an appropriate signal indicative of film guide retraction (also indicative that the splice assembly is free to operate) to the control logic circuit. The control logic circuit now delivers an appropriate signal via the AC power switching circuit and line 274 for causing the cam motor to begin rotating the cam 172 in a clockwise direction. A switch SW-6 (FIG 2) is opened upon an initial rotation of the cam and causes a film identification start signal to be delivered to the switch interface circuit which routes this signal to logic circuit. The control logic circuit, therefore, delivers an appropriate energizing signal to lamps 194 via the DC power switching circuit and line 276 to cause them to flash momentarily. The camera 192 picks up the illuminated image of the customer identifying indicia present on the cartridge and photographically transfers it to the leading edge portion of the film strip adjacent the splice. It will be recognized that appropriate time delay circuitry may be provided to control the length of the film identification flash.

Closure of switch SW-7 upon completion of the splice cycle causes a splice complete signal to be presented to the switch interface circuit. This circuit instructs the control logic circuit that the splice cycle is now complete and, in response thereto, the control logic circuit causes the pitch locator solenoid to be de-energized (thereby releasing the pitch locator) and further causes the advance capstan brake to be released (thereby placing the advance capstan in a free-wheeling mode with its brake and clutch disengaged simultaneously). The control logic circuit additionally causes valve 258 to be closed and valve 256 to be opened so that cylinder 260 is moved in a reverse direction toward its contracted position thereby moving finger 74 toward its retracted position and causing the empty cartridge to be discharged.

At this time, the take-up capstan clutch is engaged in response to a signal routed from the control logic circuit via circuit 224 and line 277 while simultaneously therewith its brake is disengaged in response to a corresponding signal on line 278. The now spliced film strips $F_1$ and $F_2$ are thus advanced the take-up capstan along out-feed track 114 toward the take-up assembly. The control logic circuit then delivers an appropriate signal via circuit 220 and line 280 to the take-up reel motor which winds the spliced film onto the take-up reel, provided proper tension is being exerted by the arm 210. The spliced film strips are advanced to and wound up by the take-up assembly in this manner until the trailing edge hole of strip $F_2$ (refer again to FIG. 11) passes the leading edge sensor which, upon expiration of a time interval sufficient to allow the trailing edge of that film strip to be properly positioned at the splicing station in preparation for the next splice, and delivers an appropriate command signal to the control logic circuit for causing the take-up capstan clutch to be disengaged and the take-up capstan brake to be applied. The take-up assembly, in combination with the FIG. 18 circuit, respond to the increased tension produced by application of the take-up capstan brake and terminate further winding.

During the aforementioned take-up of the spliced strips, the cartridge violator finger is being retracted and simultaneously discharges the now-empty cartridge. As the violator finger approaches and reaches its retracted position, of course, the probe 56 is inserted into the cartridge magazine and causes a fresh cartridge to be dropped into the cartridge retainer in preparation for the next unloading cycle. When the violator finger reaches its retracted position (FIG. 3), switch SW-1 is again closed and switch SW-2 is opened thereby causing a violator finger retracted signal to be delivered to the interface circuit 218 which routes that signal to the control logic circuit. This circuit then causes the film guide to be swung back to its FIG. 12 advanced position in preparation for the next unloading and splicing cycle.

The FIG. 18 system may now be reset by means not shown in preparation for the next unloading and splicing cycle. Throughout the aforementioned sequence of operations, feed conditions with respect to the film strips and the splice tape may be monitored, one or more audible alarm signals produced when appropriate, or further operation of the system terminated when appropriate. Furthermore, the system may be reset or inhibited manually at other times by means not shown, if desired.

It is also possible to bypass the cartridge dispensing assembly and manually feed an already unloaded film strip directly into feed track 95. A manual feed assembly (referenced generally by numeral 282 in FIG. 2) is located adjacent feed track 95 upstream of the trailing edge cutting assembly. The assembly 282 includes a manual feed track 284 generally similar to the feed tracks 94, 95, 96, 100 and 114, and a manual feed capstan 286. Referring again to FIG. 9, feed track 284 is pivotally mounted by deck 12 for rotational movement about a vertical axis and is biased by spring 288 in a counterclockwise direction (as illustrated in FIG. 9) such that its terminus normally averts from feed track 95. To manually feed in a film strip via the manual feed track, the feed track is rotated manually in a clockwise direction (as illustrated in FIG. 9) until its terminus abuts against the in-feed track 95. Such movement closes switches SW-11 and SW-16 which respectively allow the manual feed capstan to be energized (FIG. 18) via now closed switch SW-16, line 263 and branch line 290 in response to presentation of a manual feed logic signal to the FIG. 18 switch interface circuit. The FIG. 18 control circuit, upon receipt of the manual feed logic signal, then performs basically the same sequence of operations described previously while omitting the various functions associated with cartridge dispensing and unloading.

It is also possible to bypass the advance capstan 98 by manually feeding an already unloaded film strip into the feed track 100 at a location just upstream of the splicing station using the secondary manual feed track 292 of FIG. 9. In this case, the end-to-end spacing of the manually fed film strip with respect to the preceding film strip is controlled and maintained by the splice alignment guide 294, of FIGS. 9 and 11. The splice alignment guide is pivotally mounted by a bracket 296 supported from the deck to swing in a vertical plane to and from a position intervening between the pressure and heat application platens. The guide includes a generally flat positioning member 298 which includes an upstanding vertical rib portion 300 (FIG. 11) having a width corresponding to the desired end splice gap between the adjacent film strip ends. To operate the splice alignment guide, it is swung downwardly to a position intervening between the heat and the pressure application platens and then the manually inserted film strip is moved along the feed track until the leading edge thereof abuts against the rib portion 300. A switch SW-18 is operated by such movement of the splice alignment guide and delivers a manual splice signal to the switch interface circuit which routes that signal to the control logic circuit. The latter circuit inhibits further operation of the system during the time that the splice alignment guide is in its lowered position, thereby preventing damage to the splicing mechanism.

The manual cartridge feed assembly of FIG. 19 may be substituted for the automated cartridge dispensing assembly described hereinabove. The manual cartridge feed assembly is operable with a cartridge retainer and film extraction assembly generally similar to those illustrated and described above, like parts being designated with the same reference numerals primed.

The manual cartridge feed assembly includes a movable light shield door 302 for preventing escape of light generated by the film identification system, and a door locking and unlocking mechanism, generally designated 304. The door is mounted from the upper end of shaft 76′, rotational movement of which is controlled selectively by the mechanism 304. This mechanism includes a yoke 306 which is mounted by shaft 308 intermediate its length for horizontal rocking movement about a generally vertical pivot axis. The yoke includes two blocking pins, pin 310 upstanding from one arm of the yoke and engageable with a gear 312, and pin (not shown) depending from the other arm of the yoke and engageable with a lower gear 316. The gears 312 and 316 are connected to shaft 76′ by oppositely acting one way bearings 318. A solenoid selectively positions the yoke such that the pins alternately engage their respective gears to prevent the light shield door from being opened or closed, as the case may be. The switches SW-1 and SW-2 sense and control operation of the solenoid in combination with the FIG. 18 control circuit as described previously, except that switches SW-1 and SW-2 now indicate that the door is opened and closed respectively. Switch SW-20 senses when finger 74′ is retracted.

Figure 19:
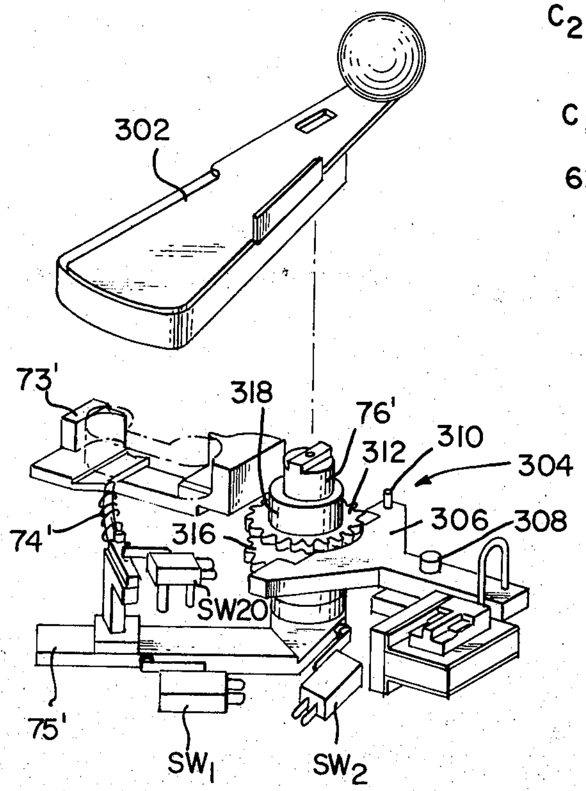
FIG. 19 is a fragmentary perspective view of a manual cartridge feed system.

In operation, the FIG. 19 feed assembly unloads and discharges individual cartridges; however, each cartridge must be positioned manually in the cartridge retainer. To prevent introduction of a fresh cartridge before completion of the splicing and film identification operations, the door 302 is locked closed by mechanism 304 until switch SW-20 is closed in response to retraction of the violator finger.

Although two preferred embodiments of the invention have been illustrated and described herein, variations will become apparent to one of ordinary skill in the art. Accordingly, the invention is not to be limited to the specific embodiments illustrated and described herein and the true scope and spirit of the invention are to be determined by reference to the appended claims.

The embodiments of the invention in which an exclusive property or privelege is claimed are defined as follows.

1. Apparatus for use in successively withdrawing film strips from a plurality of film cartridges, wherein each film strip is respectively interwound with a backing strip positioned inside the corresponding film cartridge, said apparatus comprising:

(a) magazine means for storing the plurality of film cartridges, said magazine means including a cartridge passageway in which the plurality of film cartridges may be succesively placed on edge to form a cartridge stack;

(b) cartridge dispensing means for successively dispensing film cartridges from said magazine means, said cartridge dispensing means including (1) a receptacle structure which receives said magazine means, (2) a rocker arm pivotally supported within said receptacle structure and movable between first and second positions, said rocker arm having secured thereto a first pin element which blocks said cartridge passageway in said magazine means to hold the lowest film cartridge of said cartridge stack in place when said rocker arm is moved to said first position and which retracts from said cartridge passageway to permit the dispensing of the lowest film cartridge of said cartridge stack when said rocker arm is moved to said second position, (3) biasing means to bias said rocker arm toward said first position, and (4) probe means for engaging said rocker arm and for periodically moving said rocker arm to said second position against the bias exerted by said biasing means; and (c) film extraction means for receiving film cartridges dispensed by said cartridge dispensing means and for withdrawing and separating the interwound film and backing strips positioned inside the film cartridges so received, said film extraction means including (1) stripper means for intervening between the backing strip and the film strip of a received film cartridge, and (2) finger means operating in alternating sequence with said probe means of said cartridge dispensing means to engage the backing strip in the received film cartridge when said rocker arm of said cartridge dispensing means is in said first position and to force the withdrawal of the backing strip and film strip conjointly from the received film cartridge past said stripper means such that the backing strip separates and moves away from the film strip.

2. Apparatus as set forth in claim 1 including a pivoting means connected to both said finger means and said probe means such that said finger means moves in alternating sequence with said probe means.

3. Apparatus as set forth in claim 1, wherein said film extraction means additionally includes a first roller means for receiving and exerting a tensile force on the backing strip at a point after the backing strip is separated from the film strip such that both the backing strip and the film strip are entirely withdrawn from the received film cartridge.

4. Apparatus as set forth in claim 3, including means for transporting the film strip away from said film extraction means while said first roller means is separately removing the backing strip from the film cartridge, said means for transporting the film strip having a second roller means for engaging and curving the film strip thereabout at a point before said stripping means intervenes between the backing strip and the film strip.

5. Apparatus as set forth in claim 4 additionally including a cutter means for cutting the leading and trailing edges of the film strip withdrawn from the received film cartridge and a splicer means for splicing the trailing edge of the film strip so cut to the leading edge of a film strip subsequently withdrawn from a succeeding film cartridge.

6. Apparatus as set forth in claim 1, including a film identification means for transferring a customer identification number from the film cartridge received by said film extraction means to the leading edge of the film strip withdrawn from the received film cartridge.

7. Apparatus as set forth in claim 1, wherein said stripper means includes a triangular-shaped stripper element having an inclined surface located adjacent the path of movement of said finger means.

8. Apparatus as set forth in claim 7, wherein said finger means is circular in cross-section and has curved sides such that the backing strip conforms to the sides of said finger means and curves away from the film strip as the backing and film strips approach and pass by said triangular-shaped stripper element.

9. Apparatus as set forth in claim 1, wherein said rocker arm of said cartridge dispensing means has secured thereto a second pin element such that said second pin blocks said cartridge passageway to retain the remaining film cartridges stacked therein when said rocker arm moves to said second position to permit dispensing of the lowest film cartridge in said cartridge stack.

10. Apparatus as set forth in claim 1, wherein said finger means also includes a detent means for engaging the received film cartridge when said finger means engages the backing strip positioned therein and for discharging the received film cartridge from said film extraction means when said finger means moves out of engagement with the backing strip.

* * * * *